United States Patent
Fox et al.

(10) Patent No.: US 9,884,281 B2
(45) Date of Patent: Feb. 6, 2018

(54) METHOD TO USE ULTRAFINE PARTICULATE MATTER DETECTION AND MEASUREMENT TO CONTROL AIR SUPPLY SYSTEM CONTAMINANT DELIVERY TO THE AIRCRAFT CABIN ENVIRONMENT

(71) Applicant: HONEYWELL INTERNATIONAL INC., Morristown, NJ (US)

(72) Inventors: Richard B. Fox, San Tan Valley, AZ (US); Paul Kurlak, Scottsdale, AZ (US); Deanna P. Chase, Tempe, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 248 days.

(21) Appl. No.: 14/858,694

(22) Filed: Sep. 18, 2015

(65) Prior Publication Data

US 2017/0080374 A1  Mar. 23, 2017

(51) Int. Cl.
*B01D 46/44* (2006.01)
*B64D 13/06* (2006.01)
*B01D 53/00* (2006.01)

(52) U.S. Cl.
CPC ........... *B01D 46/442* (2013.01); *B01D 53/00* (2013.01); *B64D 13/06* (2013.01);
(Continued)

(58) Field of Classification Search
CPC .................. B01D 46/442; B64D 13/06; B64D 2013/0603; B64D 2013/0651; B64D 2013/0688
See application file for complete search history.

(56) References Cited

U.S. PATENT DOCUMENTS 5,725,425 A    3/1998  Rump
5,750,999 A    5/1998  Fox
(Continued)

FOREIGN PATENT DOCUMENTS

| DE | 102009017932 B4 | 11/2010 |
| EP | 3050803 A1 | 8/2016 |
| GB | 2493262 A | 1/2013 |
| KR | WO2011/145781 A1 | 11/2011 |

OTHER PUBLICATIONS

Search Report from EP Application No. 16189339.1 dated Feb. 6, 2017.
(Continued)

*Primary Examiner* — Robert Clemente
(74) *Attorney, Agent, or Firm* — Shimokaji IP

(57) ABSTRACT

An environmental control system (ECS) having particulates in air therein includes a sensor, an air purification subsystem, and a controller in communication with the sensor and air purification subsystem. The sensor detects particulates in the air, and generates a particulate concentration signal. The controller: compares the particulate concentration signal to a predicted particulate concentration threshold that is based on one of a probability of odor detection, a probability of sensory irritancy detection, and a combination thereof. When the particulate concentration signal reaches the predicted particulate concentration threshold, the controller commands the air purification subsystem to alter a condition in the air containing the particulates.

19 Claims, 19 Drawing Sheets

(52) U.S. Cl.
CPC ............... *B64D 2013/0603* (2013.01); *B64D 2013/0651* (2013.01); *B64D 2013/0688* (2013.01)

(56) References Cited

U.S. PATENT DOCUMENTS

| | | | |
|---|---|---|---|
| 6,711,470 | B1 | 3/2004 | Hartenstein |
| 7,089,747 | B2 | 8/2006 | Fox |
| 7,122,065 | B2 | 10/2006 | Fox |
| 7,143,631 | B2 | 12/2006 | Nurcombe |
| 7,803,039 | B2 | 9/2010 | Inoue |
| 7,824,479 | B2 | 11/2010 | Rowley |
| 7,833,305 | B1 | 11/2010 | Studer |
| 7,871,038 | B2 | 1/2011 | Space |
| 2004/0065204 | A1* | 4/2004 | Dietrich ............. B01D 46/442 96/111 |
| 2005/0053515 | A1 | 3/2005 | Yates et al. |
| 2006/0187070 | A1* | 8/2006 | Liang ............. B01D 46/008 340/607 |
| 2008/0283663 | A1* | 11/2008 | Space ............. B64D 13/06 244/118.5 |
| 2013/0030718 | A1 | 1/2013 | Williams |
| 2013/0327891 | A1 | 12/2013 | Zhang |
| 2014/0365100 | A1 | 12/2014 | Speier |
| 2014/0366719 | A1* | 12/2014 | Reid ............. B01D 46/002 95/12 |
| 2016/0214723 | A1* | 7/2016 | Fox ............. B64D 13/06 |
| 2016/0214724 | A1* | 7/2016 | Fox ............. B64D 13/06 |

OTHER PUBLICATIONS

Fox, Assessing Aircraft Supply Air to Recommend Compounds for Timely Warning of Contamination, Dissertation submitted to Northcentral University, Apr. 2012.
Parthasarathy, Ventilation Relevant Contaminants of Concern in Commercial Buildings Screening Process and Results, Ernest Orlando Lawrence Berkeley National Laboratory, Apr. 29, 2011.
Hall, A Portable Wireless Particulate Sensor System for Continuous Real Time Environmental Monitoring, Boise State University ScholarWorks, Jul. 15, 2012.
Hall, Monitoring Aircraft Cabin Particulate Matter Using a Wireless Sensor Network, Boise State University ScholarWorks, Jul. 14, 2013.
Abraham, The biological and toxicological activity of gases and vapors, Toxicology in Vitro 24 (2010) 357-362.
Devos, Standardized Human Olfactory Threshold, IRL Press, Oxford University Press, 1990.
Logue, Hazard Assessment of Chemical Air Contaminants Measured in Residences, Ernest Orlando Lawrence Berkeley National Laboratory, Jun. 2010.
Molhave, Human Reactions to Low Concentrations of Volatile Organic Compounds, Environmental International, vol. 12, pp. 167-175, 1986.
The PID Handbook, Third Edition, RAE Systems Inc., 2013.
BASF Aerospace Materials, Dual Ozone/VOC catalytic converter, Aug. 2011.
Grady, Vehicle Cabin Air Quality with Fractional Air Recirculation, SAE International, Apr. 8, 2013.
RAE Systems, http://www.raesystems.com/sites/default/files/content/resources/Technical-Note-106_A-Guideline-for-Pid-Instrument-Response_07-14.pdf (Jan. 18, 2015).
Wheeler, Air Travel Stinks: Improving Air Quality on Planes, Nov. 24, 2014.
Cranfield University, Aircraft Cabin Air Sampling Study; Part 1 of the Final Report, Mar. 2011.
Cranfield University, Aircraft Cabin Air Sampling Study; Part 2 of the Final Report, Apr. 2011.

* cited by examiner

| PARTICLES PER CUBIC CENTIMETER ||||
|---|---|---|---|---|
| AIRCRAFT TYPE | PARTICLES-TAKEOFF | PARTICLES-CRUISE | PARTICLES-DESCENT | PARTICLES-LANDING |
| B757 Cargo | 20000 | 0 | 5000 | 70000 |
| B757 Cargo | 54000 | 23000 | 1000 | 3000 |
| B757 Cargo | 32500 | 0 | 4000 | 20000 |
| B757 Cargo | 500000 | 200 | 10000 | 20000 |
| B757 Cargo | 69000 | 0 | 2500 | 39000 |
| B757 Cargo | 81000 | 0 | 10000 | 98000 |
| B757 Cargo | 375000 | 200 | 5000 | 20000 |
| B757 Cargo | 360000 | 100 | 500 | 15000 |
| B757 Cargo | 251000 | 100 | 40000 | 175000 |
| B757 Cargo | 750 | 20 | 750 | 4250 |
| B757 Cargo | 22500 | 0 | 26000 | 260000 |
| B757 Cargo | 500000 | 100 | 125000 | 120000 |
| B757 Cargo | 20000 | 100 | 32000 | 2500 |
| B757 Cargo | 50000 | 15000 | 1000 | 410000 |
| B757 Cargo | 24000 | 0 | 4000 | 35000 |
| B757 Cargo | 180000 | 0 | 8000 | 121000 |
| B757 Cargo | 82000 | 500 | 1000 | 6000 |
| B757 Cargo | 75000 | 0 | 6000 | 105000 |
| B757 Cargo | 22000 | 2500 | 3000 | 6000 |
| B757 Cargo | 240000 | 0 | 500 | 8000 |
| B757 Passenger | 25000 | 100 | 5000 | 28000 |
| B757 Passenger | 45000 | 100 | 2000 | 45000 |
| B757 Passenger | 95000 | 1000 | 2000 | 8000 |
| B757 Passenger | 220000 | 0 | 100 | 50000 |
| B757 Passenger | 310000 | 0 | 25000 | 45000 |
| B757 Passenger | 58000 | 0 | 250 | 18000 |
| B757 Passenger | 119000 | 50 | 4000 | 18000 |
| B757 Passenger | 48000 | 50 | 100 | 17000 |
| B757 Passenger | 145000 | 0 | 200 | 19000 |
| B757 Passenger | 80000 | 0 | 4000 | 70000 |
| B757 Passenger | 115000 | 0 | 100 | 8000 |
| B757 Passenger | 50000 | 4000 | 100 | 46000 |
| B757 Passenger | 70000 | 0 | 2000 | 15000 |
| B757 Passenger | 40000 | 100 | 2500 | 28000 |
| B757 Passenger | 105000 | 0 | 220000 | 25000 |
| B757 Passenger | 185000 | 100 | 1000 | 50000 |
| B757 Passenger | 115000 | 0 | 500 | 40000 |
| B757 Passenger | 200000 | 0 | 1000 | 50000 |
| B757 Passenger | 110000 | 0 | 1000 | 10000 |
| B757 Passenger | 270000 | 0 | 100 | 22000 |
| B757 Passenger | 125000 | 0 | 500 | 59000 |
| B757 Passenger | 33000 | 0 | 1000 | 27000 |

FIG. 3B1

| A320/1 | 13000 | 100 | 500 | 25000 |
|---|---|---|---|---|
| A320/2 | 210000 | 0 | 20000 | 250 |
| A320/3 | 220000 | 100 | 200 | 5000 |
| A320/4 | 162000 | 0 | 2000 | 50000 |
| A320/5 | 115000 | 0 | 2000 | 18000 |
| A320/6 | 165000 | 0 | 1500 | 15000 |
| A320/7 | 67000 | 0 | 1500 | 15000 |
| A320/8 | 118000 | 0 | 200 | 18000 |
| A320/9 | 71000 | 0 | 2000 | 69000 |
| A320/10 | 165000 | 0 | 200 | 25000 |
| A320/11 | 42000 | 15000 | 200 | 58000 |
| A320/12 | 425000 | 0 | 0 | 10 |
| A320/13 | 130000 | 0 | 2000 | 35000 |
| A320/14 | 52000 | 0 | 500 | 61000 |
| A320/15 | 350000 | 0 | 500 | 5000 |
| A320/16 | 32000 | 0 | 500 | 5000 |
| A320/17 | 65000 | 0 | 1000 | 18000 |
| A320/18 | 290000 | 0 | 1000 | 20000 |
| A320/19 | 90000 | 0 | 100 | 4000 |
| A320/20 | 175000 | 0 | 500 | 62000 |
| BAe146 | 240000 | 0 | 1000 | 54000 |
| BAe146 | 120000 | 0 | 5000 | 10000 |
| BAe146 | 150000 | 0 | 200 | 41000 |
| BAe146 | 135000 | 0 | 200 | 19000 |
| BAe146 | 40000 | 0 | 35000 | 79000 |
| BAe146 | 140000 | 0 | 17000 | 21000 |
| BAe146 | 69000 | 85000 | 2500 | 2500 |
| BAe146 | 340000 | 0 | 500 | 1000 |
| BAe146 | 38000 | 0 | 200 | 75000 |
| BAe146 | 170000 | 0 | 30000 | 75000 |
| BAe146 | 225000 | 0 | 0 | 60000 |
| BAe146 | 80000 | 0 | 165000 | 20000 |
| BAe146 | 180000 | 0 | 118000 | 50000 |
| BAe146 | 275000 | 0 | 0 | 0 |
| BAe146 | 185000 | 0 | 200 | 14000 |
| BAe146 | 500000 | 0 | 200 | 20000 |
| BAe146 | 500000 | 0 | 200 | 50000 |
| BAe146 | 280000 | 0 | 500 | 55000 |
| BAe146 | 120000 | 0 | 25000 | 50000 |
| BAe146 | 20000 | 0 | 500 | 125000 |
| A319 | 55000 | 500 | 8000 | 35000 |
| A320 | 58000 | 500 | 38000 | 158000 |

FIG. 3B2

| | | | | |
|---|---|---|---|---|
| A320 | 155000 | 500 | 2000 | 130000 |
| A320 | 80000 | 500 | 5000 | 121000 |
| A320 | 88000 | 500 | 4000 | 98000 |
| A320 | 100000 | 100 | 470000 | 210000 |
| A320 | 110000 | 50 | 4000 | 30000 |
| A320 | 65000 | 50 | 10000 | 110000 |
| A320 | 205000 | 50 | 15000 | 75000 |
| A320 | 120000 | 50 | 500 | 32000 |
| A320 | 98000 | 10 | 500 | 25000 |
| A320 | 22000 | 50 | 1000 | 54000 |
| A320 | 255000 | 500 | 1000 | 25000 |
| A320 | 140000 | 200 | 2000 | 10000 |
| A320 | 119000 | 100 | 4000 | 25000 |
| A320 | 72000 | 100 | 400 | 26000 |
| A320 | 98000 | 200 | 400 | 42000 |
| A320 | 22000 | 200 | 3000 | 10000 |
| A320 | 99000 | 50 | 500 | 12000 |
| A320 | 34000 | 50 | 500 | 8000 |
| max | 500000 | 85000 | 470000 | 410000 |
| median | 110000 | 0 | 1000 | 26500 |

FIG. 3B3

| COMPOUND | ODOR THRESHOLDS DEVOS ET AL. (1990) LOG 10 VOLUME | ODOR THRESHOLDS DEVOS ET AL. (1990) LOG 10 MASS | ODOR THRESHOLDS DEVOS ET AL. (1990) ppmV | ODOR THRESHOLDS DEVOS ET AL. (1990) ug/m$^3$ |
|---|---|---|---|---|
| N-OCTANAL | 8.87 | 8.14 | 0.0013 | 7.24 |
| P-CYMENE (4-METHYLCUMENE) (1-ISOPROPYL-4-METHYLBENZENE) | 8.67 | 7.92 | 0.0021 | 12.0 |
| N-NONANAL | 8.65 | 7.87 | 0.0022 | 13.5 |
| ETHYL BENZENE | 8.54 | 7.89 | 0.0029 | 12.9 |
| N-HEPTANAL | 8.32 | 7.64 | 0.0048 | 22.9 |
| VALERALDEHYDE (PENTANAL) | 8.22 | 7.66 | 0.0060 | 21.9 |
| PHENANTHRENE | 8.11 | 7.24 | 0.0078 | 57.5 |
| BUTANAL (BUTYRALDEHYDE) | 8.05 | 7.56 | 0.0089 | 27.5 |
| HEXANAL | 7.86 | 7.24 | 0.0138 | 57.5 |
| NAPHTHALENE | 7.83 | 7.1 | 0.0148 | 79.4 |
| ISOBUTYRALDEHYDE (2-METHYLPROPANAL) | 7.39 | 6.91 | 0.0407 | 123 |
| BENZALDEHYDE | 7.38 | 6.73 | 0.0417 | 186 |
| CARBON DISULFIDE | 7.02 | 6.52 | 0.0955 | 302 |
| PROPIONALDEHYDE (2-PROPYNAL) | 7.01 | 6.66 | 0.0977 | 219 |
| PHENOL | 6.96 | 6.37 | 0.1096 | 427 |
| CROTONALDEHYDE (TRANS-2-BUTENAL) | 6.87 | 6.41 | 0.1349 | 389 |
| STYRENE (VINYL BENZENE) | 6.84 | 6.2 | 0.1445 | 631 |
| 1,2,4-TRIMETHYLBENZENE (PSEUDOCUMENE) | 6.81 | 6.11 | 0.155 | 776 |
| 2-HEXANONE | 6.78 | 6.15 | 0.166 | 708 |
| ACROLEIN (2-PROPENAL) | 6.76 | 6.39 | 0.174 | 407 |
| ACETALDEHYDE (ETHANAL) | 6.73 | 6.47 | 0.186 | 339 |
| 1,3,5-TRIMETHYLBENZENE (MESITYLENE) | 6.64 | 5.94 | 0.229 | 1148 |
| M-XYLENE (1,3-DIMETHYLBENZENE) | 6.49 | 5.85 | 0.324 | 1413 |
| P-XYLENE (1,4-DIMETHYLBENZENE) | 6.31 | 5.67 | 0.490 | 2138 |
| VINYL ACETATE | 6.22 | 5.66 | 0.603 | 2188 |

FIG. 4A continued from FIG. 4A ③ continued from FIG. 4A ③

| | | | | |
|---|---|---|---|---|
| N-DECANE | 6.13 | 5.36 | 0.741 | 4365 |
| O-XYLENE (1,2-DIMETHYLBENZENE) | 6.07 | 5.42 | 0.851 | 3802 |
| FORMALDEHYDE (METHANAL) | 6.06 | 5.97 | 0.871 | 1072 |
| N-UNDECANE | 5.93 | 5.11 | 1.17 | 7762 |
| N-NONANE | 5.9 | 5.17 | 1.26 | 6761 |
| TOLUENE | 5.81 | 5.23 | 1.55 | 5888 |
| N-DODECANE | 5.69 | 4.84 | 2.04 | 14454 |
| ETHYL ACETATE | 5.58 | 5.01 | 2.63 | 9772 |
| BENZENE | 5.44 | 4.92 | 3.63 | 12023 |
| CHLOROETHANE | 5.39 | 4.96 | 4.07 | 10965 |
| OCTANE | 5.24 | 4.56 | 5.75 | 27542 |
| TETRACHLOROETHENE (PERCHLOROETHYLENE) | 5.21 | 4.37 | 6.17 | 42658 |
| 2-BUTANONE (METHYL ETHYL KETONE) | 5.11 | 4.63 | 7.76 | 23442 |
| N-HEPTANE | 5.01 | 4.39 | 9.77 | 40738 |
| CHLOROMETHANE | 4.99 | 4.67 | 10 | 21380 |
| 2-PROPANOL (ISOPROPYL ALCOHOL) | 4.99 | 4.59 | 10 | 25704 |
| ACETONE (2-PROPANONE) | 4.84 | 4.46 | 14 | 34674 |
| CYCLOHEXANE | 4.66 | 4.11 | 22 | 77625 |
| 1,1,1-TRICHLOROETHANE (METHYL CHLOROFORM) | 4.65 | 3.9 | 22 | 125893 |
| ETHANOL (ETHYL ALCOHOL) | 4.54 | 4.26 | 29 | 54954 |
| PENTANE | 4.5 | 4.02 | 32 | 95499 |
| ACETONITRILE (ETHANENITRILE) | 4.01 | 3.78 | 98 | 165959 |
| BUTANE | 3.69 | 3.31 | 204 | 489779 |
| PROPANE | 2.57 | 2.31 | 2692 | 4897788 |

FIG. 4B

| COMPOUND | MEAN PPM | 75th PCNTL PPM | 90th PCNTL PPM | 95th PCNTL PPM | 99th PCNTL PPM | DA-MEAN PPM | DA-75th PCNTL PPM | DA-90th PCNTL PPM | DA-95th PCNTL PPM | DA-99th PCNTL PPM |
|---|---|---|---|---|---|---|---|---|---|---|
| 2-BUTANONE (METHYL ETHYL KETONE) | 0.001 | 0.002 | 0.004 | 0.005 | 0.008 | 0.000129 | 0.000258 | 0.000515 | 0.000644 | 0.001031 |
| 2-PROPANOL (ISOPROPYL ALCOHOL) | 0.015 | 0.017 | 0.056 | 0.102 | 0.292 | 0.0015 | 0.0017 | 0.0056 | 0.0102 | 0.0292 |
| ACETALDEHYDE (ETHANAL) | 0.008 | 0.008 | 0.017 | 0.028 | 0.085 | 0.043011 | 0.043011 | 0.091398 | 0.150538 | 0.456989 |
| ACETONE (2-PROPANONE) | 0.03 | 0.046 | 0.078 | 0.102 | 0.159 | 0.002143 | 0.003286 | 0.005571 | 0.007286 | 0.011357 |
| ACETONITRILE (ETHANENITRILE) | 0.018 | 0.014 | 0.048 | 0.097 | 0.441 | 0.000184 | 0.000143 | 0.000491 | 0.000992 | 0.0045 |
| ACROLEIN (2-PROPENAL) | 0 | 0 | 0 | 0 | 0.01 | 0 | 0 | 0 | 0 | 0.057471 |
| BENZALDEHYDE | 0 | 0 | 0.001 | 0.001 | 0.003 | 0 | 0 | 0.023981 | 0.023981 | 0.071942 |
| BENZENE | 0 | 0.001 | 0.001 | 0.002 | 0.003 | 0 | 0.000275 | 0.000275 | 0.000551 | 0.000826 |
| BUTANAL (BUTYRALDEHYDE) | 0.001 | 0.001 | 0.002 | 0.003 | 0.011 | 0.11236 | 0.11236 | 0.224719 | 0.337079 | 1.235955 |
| BUTANE | 0.001 | 0 | 0.003 | 0.005 | 0.013 | 4.9E-06 | 0 | 1.47E-05 | 2.45E-05 | 6.37E-05 |
| CARBON DISULFIDE | 0.001 | 0.001 | 0.002 | 0.004 | 0.009 | 0.010471 | 0.010471 | 0.020942 | 0.0041885 | 0.094241 |
| CROTONALDEHYDE (TRANS-2-BUTENAL) | 0 | 0 | 0.001 | 0.002 | 0.008 | 0 | 0 | 0.007413 | 0.014826 | 0.059303 |
| CYCLOHEXANE | 0 | 0 | 0 | 0.002 | 0.009 | 0 | 0 | 0 | 9.09E-05 | 0.000409 |
| ETHANOL (ETHYL ALCOHOL) | 0.012 | 0.012 | 0.042 | 0.077 | 0.218 | 0.000414 | 0.000414 | 0.001448 | 0.002655 | 0.007517 |
| ETHYL ACETATE | 0 | 0 | 0 | 0.001 | 0.032 | 0 | 0 | 0 | 0.00038 | 0.012167 |
| ETHYL BENZENE | 0 | 0 | 0.001 | 0.001 | 0.002 | 0 | 0 | 0.344828 | 0.344828 | 0.689655 |
| FORMALDEHYDE (METHANAL) | 0.01 | 0.013 | 0.023 | 0.031 | 0.065 | 0.011481 | 0.014925 | 0.026406 | 0.035591 | 0.074627 |
| HEXANAL | 0 |  | 0.001 | 0.002 | 0.003 | 0 | 0 | 0.072464 | 0.144928 | 0.217391 |

FIG. 4C 4 continued to FIG. 4D 4 continued to FIG. 4D continued from FIG. 4C ④ | | | | | | | | | | continued from FIG. 4C ④

| | | | | | | | | | | |
|---|---|---|---|---|---|---|---|---|---|---|
| N-DECANE | 0.001 | 0.002 | 0.004 | 0.008 | 0.022 | 0.00135 | 0.002699 | 0.005398 | 0.010796 | 0.02969 |
| N-HEPTANE | 0 | 0 | 0.001 | 0.002 | 0.011 | 0 | 0 | 0.000102 | 0.000205 | 0.001126 |
| N-NONANE | 0 | 0.001 | 0.002 | 0.003 | 0.006 | 0 | 0.000794 | 0.001587 | 0.002381 | 0.004762 |
| N-UNDECANE | 0.002 | 0.002 | 0.005 | 0.009 | 0.038 | 0.001709 | 0.001709 | 0.004274 | 0.007692 | 0.032479 |
| OCTANE | 0 | 0 | 0 | 0.001 | 0.026 | 0 | 0 | 0 | 0.000174 | 0.004522 |
| O-XYLENE (1,2-DIMETHYLBENZENE) | 0 | 0 | 0.001 | 0.001 | 0.003 | 0 | 0 | 0.001175 | 0.001175 | 0.003525 |
| PENTANE | 0.001 | 0 | 0.003 | 0.005 | 0.009 | 3.13E-05 | 0 | 9.38E-05 | 0.000156 | 0.000281 |
| PHENOL | 0 | 0 | 0 | 0 | 0.001 | 0 | 0 | 0 | 0 | 0.009214 |
| PROPIONALDEHYDE (2-PROPYNAL) | 0.003 | 0.002 | 0.007 | 0.015 | 0.052 | 0.030706 | 0.020471 | 0.071648 | 0.153531 | 0.532242 |
| STYRENE (VINYL BENZENE) | 0 | 0 | 0 | 0 | 0.001 | 0 | 0 | 0 | 0 | 0.00692 |
| TETRACHLOROETHENE (PERCHLOROETHYLENE) | 0 | 0 | 0.001 | 0.001 | 0.003 | 0 | 0 | 0.000162 | 0.000162 | 0.000486 |
| TOLUENE | 0.002 | 0.003 | 0.006 | 0.008 | 0.014 | 0.00129 | 0.001935 | 0.003871 | 0.005161 | 0.009032 |
| VALERALDEHYDE (PENTANAL) | 0 | 0 | 0.001 | 0.002 | 0.004 | 0 | 0 | 0.166667 | 0.333333 | 0.666667 |
| VINYL ACETATE | 0 | 0 | 0.001 | 0.001 | 0.003 | 0 | 0 | 0.001658 | 0.001658 | 0.004975 |
| | | | | Dose Addition - Odor For Mixture | | 0.217 | 0.214 | 1.083 | 1.633 | 4.330 |

FIG. 4D

| COMPOUND | LOG(1/SIT) | ppmV – EQUATION (3) | ug/M3 |
|---|---|---|---|
| 2-METHYLPENTANE | -5.14 | 0.000007 | 0.025534516 |
| 3-METHYLHEXANE | -5.08 | 0.000008 | 0.034087006 |
| ACETALDEHYDE | 3.29 | 1949.844600 | 3512910.209 |
| ACETONITRILE | 3.29 | 1949.844600 | 3273665.473 |
| ACETOPHENONE | 2.01 | 102.329299 | 502857.4766 |
| ACROLEIN (2-PROPANAL) | 0.32 | 2.089296 | 4790.427039 |
| BENZALDEHYDE | 2.52 | 331.131121 | 1437203.87 |
| BUTYRALDEHYDE | -4.77 | 0.000017 | 0.050086033 |
| BENZYL ALCOHOL | -0.69 | 0.204174 | 903.0410689 |
| BUTANE | 0.54 | 3.467369 | 8242.2682 |
| BUTANONE (MEK) | -3.38 | 0.000417 | 1.229466308 |
| CARBON DISULFIDE | 3.13 | 1348.962883 | 4200764.209 |
| CROTONALDEHYDE | 0.55 | 3.548134 | 10171.31716 |
| CYCLOHEXANONE | 2.88 | 758.577575 | 3045169.284 |
| ETHANOL | -4.76 | 0.000017 | 0.032744574 |
| ETHYL ACETATE | -4.83 | 0.000015 | 0.053299323 |
| ETHYLBENZENE | -4 | 0.000100 | 0.434233129 |
| FORMALDEHYDE | 0.63 | 4.265795 | 5239.33863 |
| HEPTANAL | -3.13 | 0.000741 | 3.461873348 |
| HEXALDEHYDE | -3.7 | 0.000200 | 0.817354923 |
| HEXAN-2-ONE | 3.21 | 1621.810097 | 6643783.205 |
| HEXANE | 1.46 | 28.840315 | 101654.7382 |
| METHYL TERT-BUTYL ETHER | 3.14 | 1380.384265 | 4978416.542 |
| NAPHTHALENE | 5.95 | 891250.938134 | 4672050419 |
| NONANE | 1.95 | 89.125094 | 467314.3978 |
| OCTANAL | -3.24 | 0.000575 | 3.017517597 |
| OCTANE | 1.77 | 58.884366 | 275106.7924 |
| PENTANAL | -4.57 | 0.000027 | 0.094817212 |

| | | | |
|---|---|---|---|
| PENTANE | 0.9 | 7.943282 | 23439.99269 |
| PHENANTHRENE | 8.1 | 125892541.179417 | 9.17703E+11 |
| PHENOL | 2.22 | 165.958691 | 638788.2366 |
| PROPAN-2-OL (ISOPROPYL ALCOHOL) | -4.26 | 0.000055 | 0.135081417 |
| PROPANE | 0.03 | 1.071519 | 1932.678992 |
| PROPIONALDEHYDE | 3.76 | 5754.399373 | 13669346.24 |
| PROPYLBENZENE | -3.43 | 0.000372 | 1.826372973 |
| STYRENE | -3.11 | 0.000776 | 3.306590478 |
| TOLUENE | -4.47 | 0.000034 | 0.127693663 |

FIG. 5B

| COMPOUND | PPM Mean:SIT | PPM 0.75P:SIT | PPM 0.9P:SIT | PPM 0.95P:SIT | PPM 0.99P:SIT | PPM 1.0P:SIT |
|---|---|---|---|---|---|---|
| 2-METHYLPENTANE | 155.2002 | 55.49106 | 448.8481 | 972.7911 | 3418.097 | 7832.535 |
| 2-PROPANOL (ISOPROPYL ALCOHOL) | 278.7948 | 307.4771 | 1019.383 | 1849.059 | 5308.183 | 5182.06 |
| 3-METHYLHEXANE | 28.04807 | -17.2168 | 92.19709 | 224.3292 | 760.9728 | 880.1008 |
| ACETALDEHYDE (ETHANAL) | 3.9E-06 | 4.38E-06 | 8.94E-06 | 1.46E-05 | 4.39E-05 | 7.97E-05 |
| ACETONITRILE (ETHANENITRILE) | 9.18E-06 | 7.43E-06 | 2.44E-05 | 4.99E-05 | 0.000226 | 0.000247 |
| ACROLEIN (2-PROPENAL) | 0.000102 | 0.000237 | 0.000158 | 0.000178 | 0.004615 | 0.010437 |
| BENZALDEHYDE | 8.41E-07 | 1.08E-06 | 2.18E-06 | 3.54E-06 | 1.04E-05 | 1.67E-05 |
| BUTANAL (BUTYRALDEHYDE) | 35.85293 | 31.52096 | 105.2919 | 203.2331 | 621.7035 | 1217.904 |
| BUTANE | 0.000149 | -0.00028 | 0.000748 | 0.001615 | 0.003795 | 0.002427 |
| 2-BUTANONE (METHYL ETHYL KETONE) | 3.465069 | 5.871804 | 9.858502 | 12.9083 | 20.46297 | 21.14739 |
| CARBON DISULFIDE | 4.23E-07 | 5.17E-07 | 1.56E-06 | 2.71E-06 | 6.78E-06 | 6.19E-06 |
| CROTONALDEHYDE (TRANS-2-BUTENAL) | 9.5E-05 | 7.53E-05 | 0.000272 | 0.000576 | 0.002192 | 0.004916 |
| ETHANOL (ETHYL ALCOHOL) | 713.2393 | 675.1734 | 2400.715 | 4424.294 | 12508.92 | 15269.71 |
| ETHYL ACETATE* | 28.92669 | -0.27614 | 17.70921 | 84.89819 | 2167.026 | 1407.067 |
| ETHYL BENZENE | 1.85578 | 3.499079 | 6.817811 | 9.280256 | 15.64018 | 14.04775 |
| FORMALDEHYDE (METHANAL) | 0.002204 | 0.0031 | 0.005254 | 0.007414 | 0.015425 | 0.020995 |
| HEXANAL | 0.939674 | -0.94273 | 4.858988 | 8.084214 | 13.74325 | 24.46891 |
| MTBE | 1.42E-07 | 1.33E-07 | 5.34E-07 | 1.07E-06 | 3.45E-06 | 2.61E-06 |
| NAPHTHALENE* | 3.25E-11 | -1.2E-11 | 1.12E-10 | 2.14E-10 | 5.13E-10 | 2.14E-09 |
| N-NONANE | 5.62E-06 | 7.29E-06 | 2E-05 | 3.23E-05 | 6.99E-05 | 0.000107 |
| N-OCTANAL | 0.178896 | 1.390581 | 0.622264 | 1.591611 | 5.932363 | 9.942102 |
| OCTANE | 6.39E-06 | 1.96E-06 | 5.79E-06 | 2.43E-05 | 0.000448 | 0.000218 |
| PENTANE | 9.67E-05 | 4.71E-05 | 0.000445 | 0.000701 | 0.001213 | 0.001706 |
| PROPANE* | 0.000417 | 0.000554 | 0.004597 | 0.006755 | 99.09304 | 0.010348 |
| PROPIONALDEHYDE (PROPANAL) | 4.51E-07 | 2.86E-07 | 1.19E-06 | 2.55E-06 | 9.08E-06 | 1.61E-05 |
| STYRENE (VINYL BENZENE) | 0.054657 | 0.058121 | 0.325167 | 0.478945 | 0.75747 | 1.179349 |
| TOLUENE | 57.07838 | 84.94203 | 162.911 | 231.1642 | 415.1079 | 344.6121 |
| DOSE ADDITION TOTAL | 0.651819 | 0.573496 | 2.134775 | 4.011065 | 12.67784 | 16.10241 |

FIG. 5C

| PERCENTILE OF THE BLEED AIR SAMPLE POPULATION | ESTIMATE VOC MASS UG/M3 | DOSE ADDITION ODOR- PPM | DOSE ADDITION SENSORY IRRITANCY THRESHOLD (SIT) UG/M3 | UF PARTICLES/ CM^3-TAKEOFF | UF PARTICLES/ CM^3-LANDING | UF PARTICLES/ CM^3-CRUISE | UF PARTICLES/ CM^3-DESCENT |
|---|---|---|---|---|---|---|---|
| MEDIAN | 99 | 0.05 | 0.15 | 110,000 | 26,550 | 0 | 1,000 |
| 75TH PERCENTILE | 307 | 0.21 | 0.57 | 150,000 | 65,831 | 978 | 8,181 |
| 90TH PERCENTILE | 747 | 1.08 | 2.13 | 359,000 | 122,272 | 774 | 40,214 |
| 95TH PERCENTILE | 1255 | 1.63 | 4.01 | 509,556 | 178,371 | 3273 | 111,084 |
| 99TH PERCENTILE | 3727 | 4.33 | 12.68 | 991,906 | 364,089 | 80616 | 782,118 |

FIG. 6A

METHOD TO USE ULTRAFINE PARTICULATE MATTER DETECTION AND MEASUREMENT TO CONTROL AIR SUPPLY SYSTEM CONTAMINANT DELIVERY TO THE AIRCRAFT CABIN ENVIRONMENT

BACKGROUND OF THE INVENTION

The present invention generally relates to apparatus and methods for treatment of airstreams in an adaptive Environmental Control System (ECS) to remove particulates, such as ultrafine particles.

ECSs of various types and complexity are used in military and civil airplanes, helicopter, and spacecraft applications. In aircraft for example, airflow may be circulated to occupied compartments, cargo compartments, and electronic equipment bays. Air containing many pollutants such as particulate matter, aerosols, and hydrocarbons may range in humidity from dry (<2%) to very humid and may be delivered in a heated condition to the cabin from the ECS.

Aircraft occupants are not exposed to a single chemical and/or particulate in isolation, and the effects of co-exposures to multiple chemicals and/or particulates are poorly understood. Exposure duration for crews can be 14+ hours. Crews can routinely be assigned to work a 14 hour duty day without a break. The duty day can be extended if there is a maintenance delay or weather. Some international crews are assigned to work a longer duty day. There are flight safety and security implications for not adequately protecting pilots (who must perform cognitively-demanding safety-sensitive flight duties) and cabin crew (who must maintain cabin safety and security). Specifically, manufacturers are currently required to ensure that aircraft systems are designed to provide—in operation, under normal conditions and during any probable failure—"a sufficient amount of uncontaminated air to enable the crewmembers to perform their duties without undue discomfort or fatigue, and to provide reasonable passenger comfort." It has been widely recognized by air accident investigators, regulators, and pilot groups that flight safety can be compromised when pilots are exposed to oil-based contaminants in the ventilation air entering from outside the aircraft through the main engine bleeds or APU bleed or other air sources including ground supplies and electric compressors. Requiring pilots to rely on their noses to identify the presence and location of bleed air contaminants prolongs the exposure for the pilots and/or cabin occupants, depending on the location of the contaminant source.

The industry accepted approach to verification of acceptability of aircraft cabin air quality has been to gather air samples through various forms of sample media to capture the range of contaminants that might be present. There are three US Environmental Protection Agency (EPA) methods that are accepted as guidance for sample collection and analysis for volatile and semi-volatile compounds and for aldehyde compounds that may create odor and create irritancy.

The sample methodology is inadequate to fully characterize all compounds with any given method, thus requiring the use of multiple methods. The analyst must also determine—based on equipment availability and laboratory capability—which methods to use.

There is limited information in the public domain related to the concentration of ultrafine particles entering the aircraft cabin during the four phases of flight (taxi, takeoff-climb, cruise, and descent). The Institute of Environment and Health (IEH) at Cranfield University has concluded that there was an association between elevated levels of ultrafine particulate matter in the cabin air supply and when occupants detected oil odors during flight. Professor Michael Bagshaw has concluded that a level of 500,000 particle counts per cubic centimeter was associated with contamination events.

As can be seen, there may be an ongoing need to interpret real-time air particulate data and provide an indication of when the levels may increase beyond the range of acceptability to enable corrective action.

SUMMARY OF THE INVENTION

In one aspect of the present invention, an environmental control system (ECS) having particulates in air therein comprises a sensor; an air purification subsystem; and a controller in communication with the sensor and air purification subsystem; wherein the sensor: detects particulates in the air; and generates a particulate concentration signal; wherein the controller: compares the particulate concentration signal to a predicted particulate concentration threshold; wherein the predicted particulate concentration threshold is based on one of a probability of odor detection, a probability of sensory irritancy detection, and a combination thereof; and when the particulate concentration signal reaches the predicted particulate concentration threshold, commands the air purification subsystem to alter a condition in the air containing the particulates.

In another aspect of the present invention, a controller for an environmental control system (ECS) having a sensor and an air purification subsystem, wherein the controller: communicates with the sensor and air purification subsystem; receives a particulate concentration signal from the sensor; compares the particulate concentration signal to a look up table having a predicted particulate concentration threshold; and based on the comparison, commands the air purification subsystem to alter a condition of air in the ECS.

In yet another aspect of the present invention, a method of controlling particulates in air in an environment includes determining a predicted particulate concentration threshold based on one of an odor detection threshold, a sensory irritancy detection threshold, and a combination thereof; comparing the predicted particulate concentration threshold to a sensed particulate concentration in the air; and adjusting the air based on the comparison.

These and other features, aspects and advantages of the present invention will become better understood with reference to the following drawings, description and claims.

BRIEF DESCRIPTION OF THE DRAWINGS

FIG. 3B1-3 is a database of particle concentrations in air samples used in a step of calculating model particle concentrations according to the method of FIG. 2;

FIGS. 4A and 4B is a table depicting predicted odor detection thresholds of contaminants in air samples according to an exemplary embodiment of the present invention;

FIGS. 4C and 4D is a table depicting odor concentrations, and dose addition ratios thereof, at various percentiles, of contaminants in FIGS. 4A and 4B according to an exemplary embodiment of the present invention;

FIGS. 5A and 5B is a table depicting predicted sensory irritancy detection thresholds of contaminants in air samples according to an exemplary embodiment of the present invention;

FIG. 5C is a table depicting predicted sensory irritancy concentrations, and dose addition ratios thereof, at various percentiles, of contaminants in FIGS. 5A and 5B according to an exemplary embodiment of the present invention;

FIG. 6A is a table summarizing, at population percentiles over four phases of flight, predicted, combined dose addition contaminant odor detection thresholds; predicted, combined dose addition sensory irritancy detection thresholds; and particle concentrations;

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may address only one of the problems discussed above. Further, one or more of the problems discussed above may not be fully addressed by any of the features described below.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable media having computer readable program code embodied thereon.

Any combination of one or more computer readable storage media may be utilized. A computer readable storage medium is an electronic, magnetic, optical, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium is any tangible medium that can store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention generally provides an environmental control system (ECS) that can continuously adapt to changing particulates in contaminated air in the ECS. The contaminated air may include outside air entering the ECS through engines or an APU, or other air sources including ground supplies and electric compressors, as well as recirculating air in the ECS. A controller of the ECS may receive particulate concentration signal(s) from one or more sensors that sense particulate concentration(s) in the contaminated air.

One or more of these particulate concentration signals can then be compared against one or more predicted particulate concentration thresholds (i.e., predicted sensory response thresholds) or average predicted particulate concentration thresholds based on individual predicted particulate concentration thresholds (i.e., average sensory response thresholds based on individual predicted sensory response thresholds). The predicted sensory response threshold(s) can be based on one or more sensory thresholds for contaminants, such as odor detection thresholds and/or sensory irritancy thresholds. The odor detection threshold can be characterized by a probability of odor detection. The sensory irritancy threshold can be characterized by a probability of sensory irritancy.

If the predicted sensory response threshold is exceeded, the controller may send control signals to an air purification subsystem of the ECS to alter, for example, fan speed, air flow rate, or modulating the operating rate of an air purification system, or opening and closing valves to such an air purification subsystem in the outside air and/or recirculating air entering, for example, an environment. The thresholds of the supply air, the recirculated air, and the cabin air may be different. The method of determining thresholds can be the same for each air source or location. The threshold of the outside air divided by its sensory limit times the flow rate, plus the threshold of the recirculated air divided by its sensory limit times the flow rate, determines the total threshold of the cabin air.

The environment may be a cabin of an aircraft or other vehicle, or other space such as a building intended to be occupied by humans. Once the particulate concentration signal(s) drops below the total threshold of the cabin air, the controller may discontinue commanding the alteration of the contaminated air. Thus, the present invention thus enables continuous control of particles in the environment.

Figure 1A:
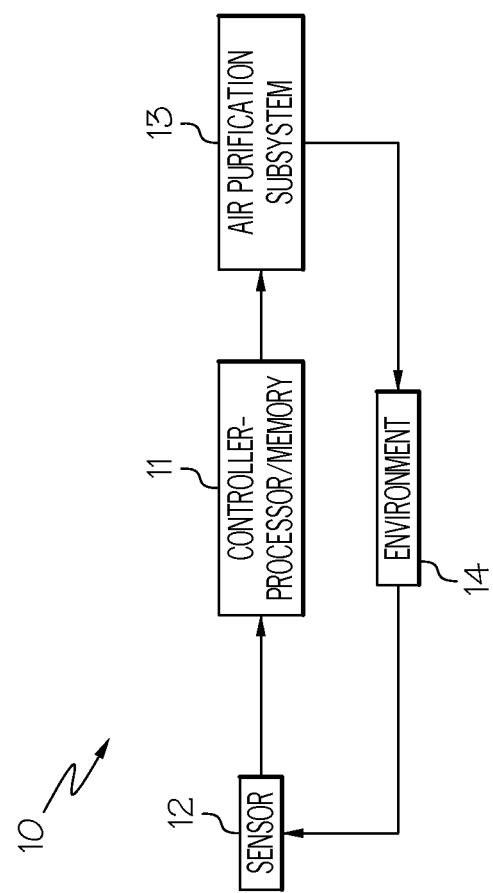
FIG. 1A is a block diagram of an environmental control system according to an exemplary embodiment of the present invention.

FIG. 1 is a block diagram of an ECS 10 according to an exemplary embodiment of the present invention. The ECS 10 may include a controller 11, such as a computer having a processor and a memory, in continuous or intermittent communication with an air purification subsystem 13 and one or more sensors 12. The sensors 12 may be positioned in various points throughout the ECS to sense particulates in the outside air supplied through engine or APU bleeds, or other air sources including ground supplies and electric compressors, and/or recirculating air in the ECS and/or, in particular, an environment 14, such an aircraft cabin. In addition to ultrafine particles (UFPs), contaminants in the ECS may include, for example, VOCs and/or SVOCs.

The sensor 12 can be any sensor capable of sensing the anticipated particulates in the contaminated air. One or more of the sensors can sense the concentration of particulates in the contaminant air. For example, the sensor 12 may be a smoke detector, such as a FAAST Aspirating Smoke Detector by Sensor Systems of Lincolnshire, Ill. These types of sensors and their operation is described on the Sensor Systems website in Detailed Operating Instructions, http://www.systemsensor.com/en-us/Pages/Aspiration.aspx, which is incorporated herein by reference in its entirety. The sensors must be optimized for continuous particle detection since they were originally optimized for long term averaging to minimize false alarms that are called in by the unit to a monitoring company or fire station.

An example configuration of multiple sensors in an ECS that can be employed in the present invention is shown in US patent application entitled "Aircraft Environmental Control System That Optimizes the Proportion of Outside Air From Engines, APUs, Ground Air Conditioning Units and the Recirculated Cabin Air to Maintain Occupant Comfort and Maximize Fuel Economy", filed on Jan. 27, 2015 as Ser. No. 14/606,315 and incorporated herein by reference in its entirety.

The air purification subsystem 13 may include various coolers, fans, and filters to alter the contaminated air. An example of an air purification subsystem that can be employed in the present invention is shown in US patent application, entitled "Aircraft Environmental Control System That Optimizes the Proportion of Outside Air From Engines, APUs, Ground Air Conditioning Units and the Recirculated Cabin Air to Maintain Occupant Comfort and Maximize Fuel Economy," filed on Jan. 27, 2015 as Ser. No. 14/606,315 and incorporated herein by reference in its entirety.

Figure 1B:
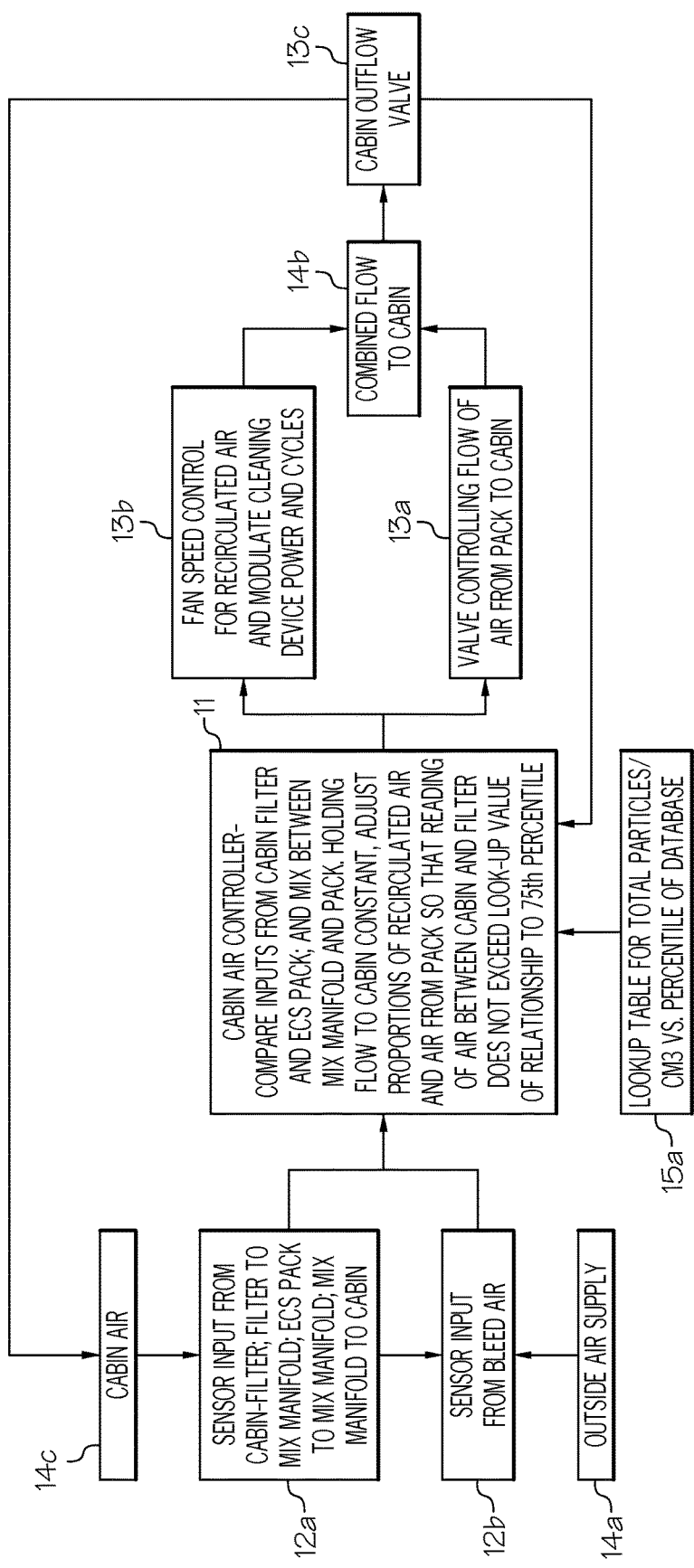
FIG. 1B is a block diagram of a controller that can be implemented in the system of FIG. 1A according to an exemplary embodiment of the present invention.

FIG. 1B is a functional block diagram of the controller 11 according to an exemplary embodiment of the present invention. The controller 11 can include a processor (not shown) and a memory (not shown) that can store instructions to be executed by the processor to implement a method of removing particulates from a space to be occupied by humans, such as the cabin of an aircraft, according to the present invention. The controller 11 may receive a particulate concentration signal(s) from a sensor(s) 12a which may sense UFPs from, for example, a cabin filter, a filter to a mix manifold, an ECS pack to a mix manifold, and the mix manifold to the cabin. The controller 11 may also receive a particulate concentration signal(s) from a sensor(s) 12b which may sense UFPs from bleed air.

The controller 11 may then compare the particulate concentration signal(s) to a particulate concentration look up table that may have information/data of particulate concentration versus population percentile of a sample database (e.g., FIG. 6A). In embodiments, the look up table 6A may include one or more predicted particulate concentration thresholds that are based on and correlate to one or more probabilities of odor detection and/or sensory irritancy detection.

Based on the foregoing comparison, the controller 11 may then command a valve 13a to alter valve opening/closing and thereby alter a flow of outside air. Also, in addition to or in lieu of the foregoing command, the controller may command a fan 13b to alter a fan speed of recirculated air. Alternatively, the response of the controller may be to modulate an air purification device, increasing or decreasing its power to effect the desired change in air particle concentrations Either alone or in combination with commanding the valve 13a and the fan 13b, the controller may command an outflow valve 13c to open or close. The valve 13c may enable different combinations of outside air and recirculated air to enter the cabin as cabin air 14*c*.

Figure 2:
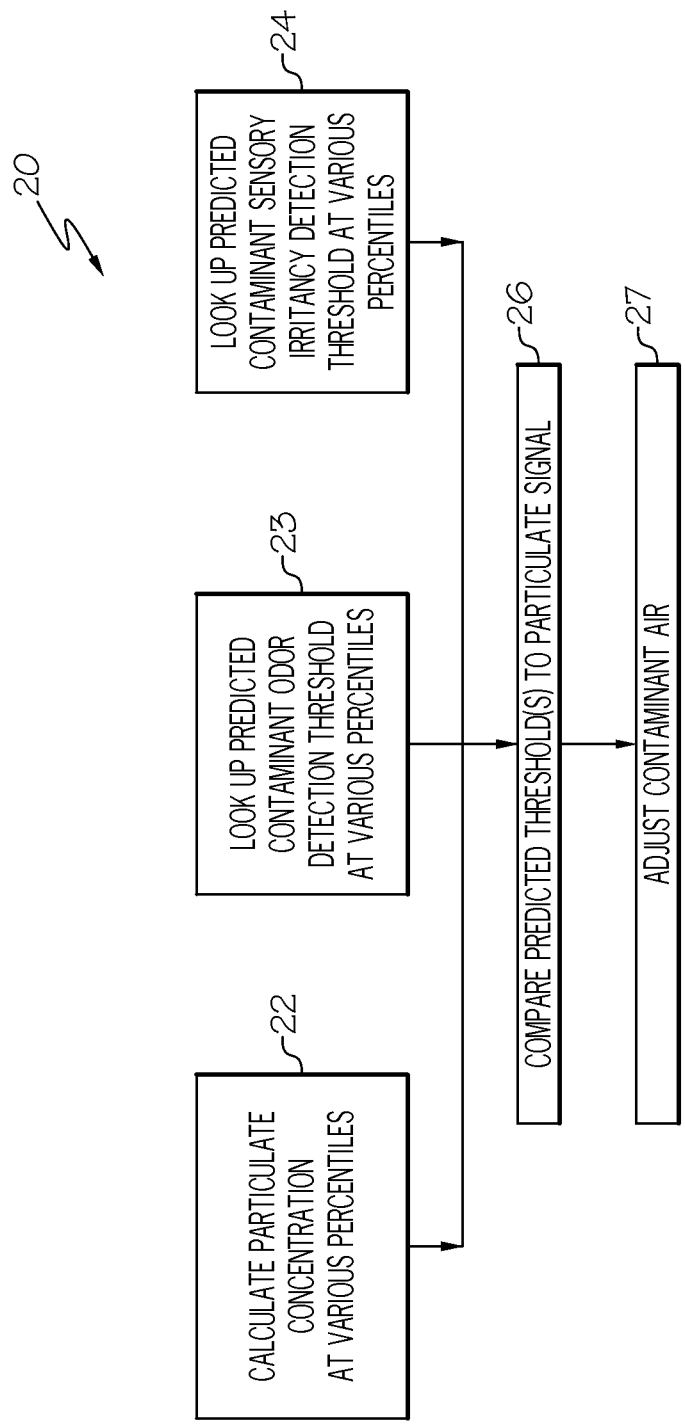
FIG. 2 is a flow chart of a method of controlling particulates in an environmental control system according to an exemplary embodiment of the present invention.

FIG. 2A is a flow chart that depicts general exemplary steps of a method 20, which may be implemented by a controller, such as controller 11, for altering or removing UFPs from an environment such as an aircraft cabin.

Figure 3A:
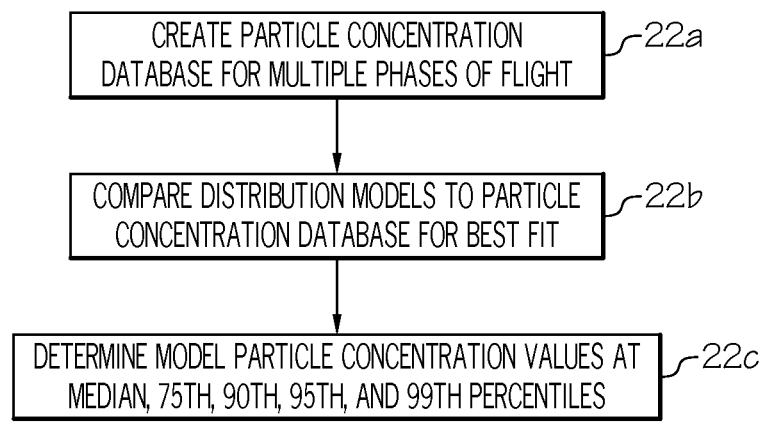
FIG. 3A is a flow chart of sub-steps of a step of calculating model particle concentrations according to the method of FIG. 2.
Figure 3C:
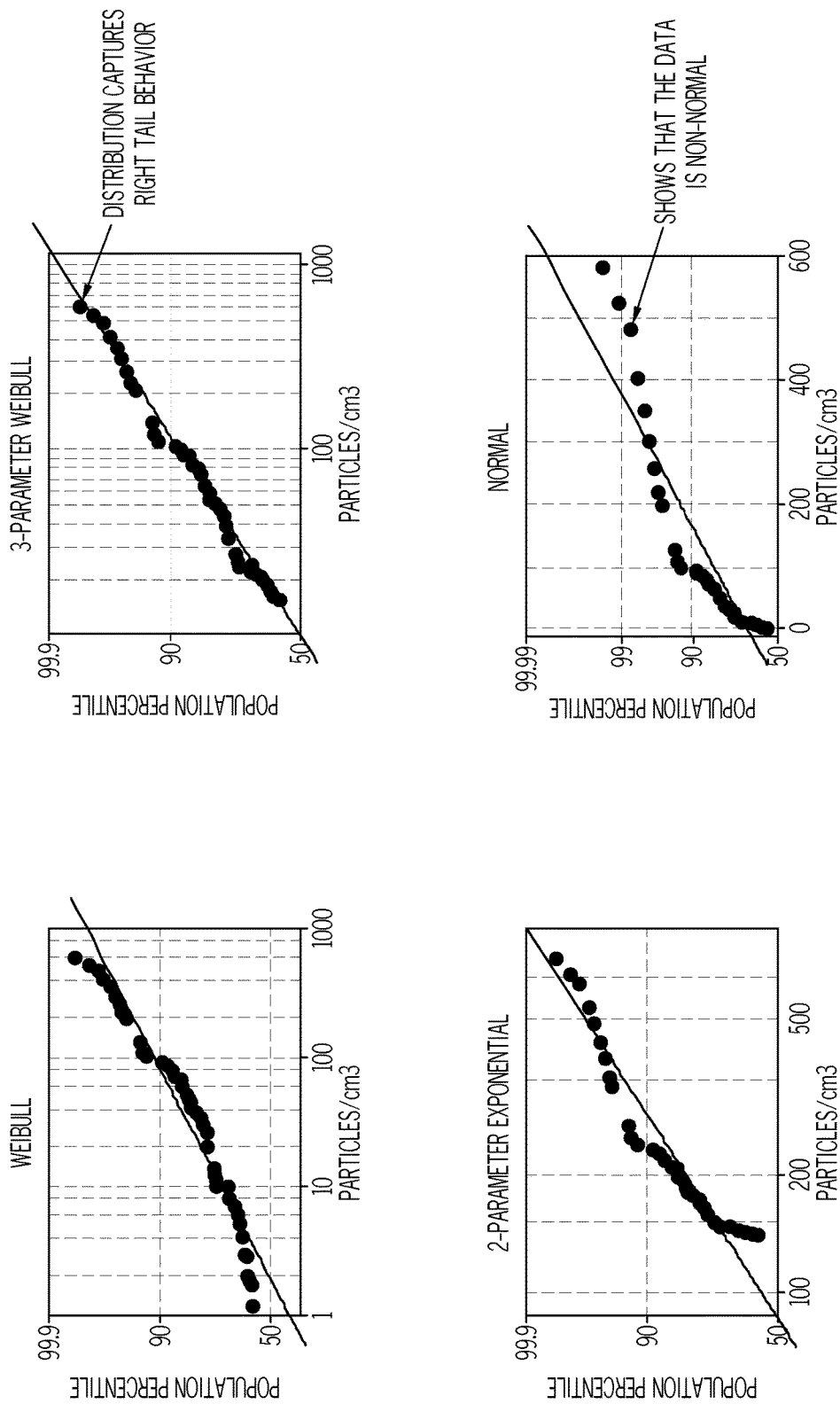
FIG. 3C is a series of graphs depicting other sub-steps of a step of calculating model particle concentrations according to the method of FIG. 2.

The method 20 may include, in an embodiment, a step 22, as further shown in exemplary FIGS. 3A-3C, which may generally include calculating predicted (as opposed to actual) particle concentrations at various sample population percentiles, such as the 75th, 90th, 95th, and 99th percentiles, as well as calculating a mean concentration.

The method 20 may include, in an embodiment, a step 23, as further shown in exemplary FIG. 4, which may generally include looking up in a database or table predicted, individual (and/or multiple) contaminant odor detection thresholds (i.e., responses). The odor detection thresholds can be at various sample population percentiles, which can be the same or different percentiles as the particle concentrations above, as well as a mean odor threshold. The foregoing database or table may further include dose addition odor ratios (i.e., probabilities, thresholds or responses) based on conversions of the individual and/or multiple odor detection thresholds.

The method 20 may include, in an embodiment, a step 24, as further shown in exemplary FIG. 5, which may generally include looking up in a database or table predicted, individual (and/or multiple) contaminant sensory irritancy detection thresholds (i.e., responses). The sensory irritancy detection thresholds can be at various sample population percentiles, which can be the same or different percentiles as the particle concentrations and/or odor thresholds above, as well as a mean irritancy threshold. The foregoing database or table may further include dose addition irritancy ratios (i.e., probabilities, thresholds or responses) based on conversions of the individual and/or multiple irritancy detection thresholds.

The method 20 may include, in an embodiment, a step 26, as further shown in exemplary FIGS. 6A-6D, which may generally include comparing one or more of predicted sensory response thresholds based on odor detection thresholds (or dose addition odor ratios), at various sample population percentiles, to one or more particulate concentration signals from one or more sensors. Step 26 may also include, in addition to or in lieu of the foregoing comparison, comparing one or more predicted sensory response thresholds based on sensory irritancy detection thresholds (or dose addition irritancy ratios), at various sample population percentiles, to one or more particle concentration signals from one or more sensors. The particulate concentration signals can be based on a combination or mixture of the individual particulate concentration signals determined in steps 12*a*, 12*b*.

The method 20 may include, in an embodiment, a step 27 which may generally include adjusting one or more of the contaminant air sources based on the foregoing comparison(s). The adjusting may occur prior to or when the particulate concentration(s) reach a predicted particulate concentration threshold (i.e., predicted sensory response threshold).

Referring to FIG. 3A, step 22 can include sub-steps 22*a*, 22*b*, and 22*c* according to an exemplary embodiment.

In the sub-step 22*a*, and as shown in FIG. 3B1-3, a database can be created of particulate concentrations from a plurality of air samples at four operations or phases of flight. In the exemplary embodiment of FIG. 3B, the database can be created from existing data, such as from Crump et. al., "Aircraft Cabin Air Sampling Study; Part 2 of the Final Report", Institute of Environment and Health, Cranfield University (2011), and incorporated herein by reference in its entirety. In other embodiments, the database can be created from gathering actual samples and measuring actual concentrations.

In the sub-step 22*b*, and as shown in FIG. 3C, sample population percentile can be plotted against actual particulate concentration at one or more of the four phases of flight. Also in sub-step 22*b*, one or more distribution model plot(s) of population percentile versus predicted particulate concentration can be compared against the actual concentration plots to determine which distribution model best fits or matches the actual concentration plots.

In the exemplary embodiment shown in FIG. 3C, four distribution models are used—Weibull, 2-parameter exponential, 3-parameter Weibull, and normal—at one phase of flight. However, more or less than four models can be used, and models other than the ones used in FIG. 3C can be used. In the example of FIG. 3C, the 3-parameter Weibull model appears to be the best fit.

In the sub-step 22*c*, and as shown in FIG. 3C, using the best fit between model plots and actual plots, predicted particulate concentrations at one or more population percentiles can be determined. Therefore, as an example, using the 3-parameter Weibull model as the best fit, predicted particulate concentrations in the model at the $75^{th}$, $90^{th}$, $95^{th}$ and $99^{th}$ percentiles, as well as a median, can be determined from reading the concentrations on the plotted model. These predicted concentrations at population percentiles can then be included in a database or table, such as in FIG. 6A, or in a graph, such as in FIG. 6B, described below.

Without intending to limit the scope of the present invention, it is noted that the relationship between the concentrations of contaminants in a mixture to predicted odor is believed to be similar to the relationship of concentrations of contaminants in a mixture to predicted sensory irritancy. Cometto-Muñiz, J. E., Cain, W. S., Abraham, M. H., & Gola, J. M. R. (1999). Chemosensory detectability of 1-butanol and 2-heptanone singly and in binary mixtures. *Physiology & Behaviour*, 67, 269-276. doi: 10.1016/S0031-9384(99)00074-8, which is incorporated herein by reference in its entirety. A strong correlation between dose additivity of a mixture on predicted odor detection levels half-way between chance and perfect detection has been reported at a probability level of 0.3 ($0.00<P<0.35$). Cometto-Muñiz, J. E., Cain, W. S., & Abraham, M. H. (2003). Dose-addition of individual odorants in the odor detection of binary mixtures. Behavioural Brain Research, 138, (1), 95-105. doi: 10.1016/S0166-4328(02)00234-6 which is incorporated herein by reference in its entirety. A strong correlation between dose additivity at sensory irritancy detection levels half-way between chance and perfect detection has been reported at a probability level of 0.6 ($0.55<P<0.65$) by Cometto-Muñiz et al. (2003).

Figure 6B:
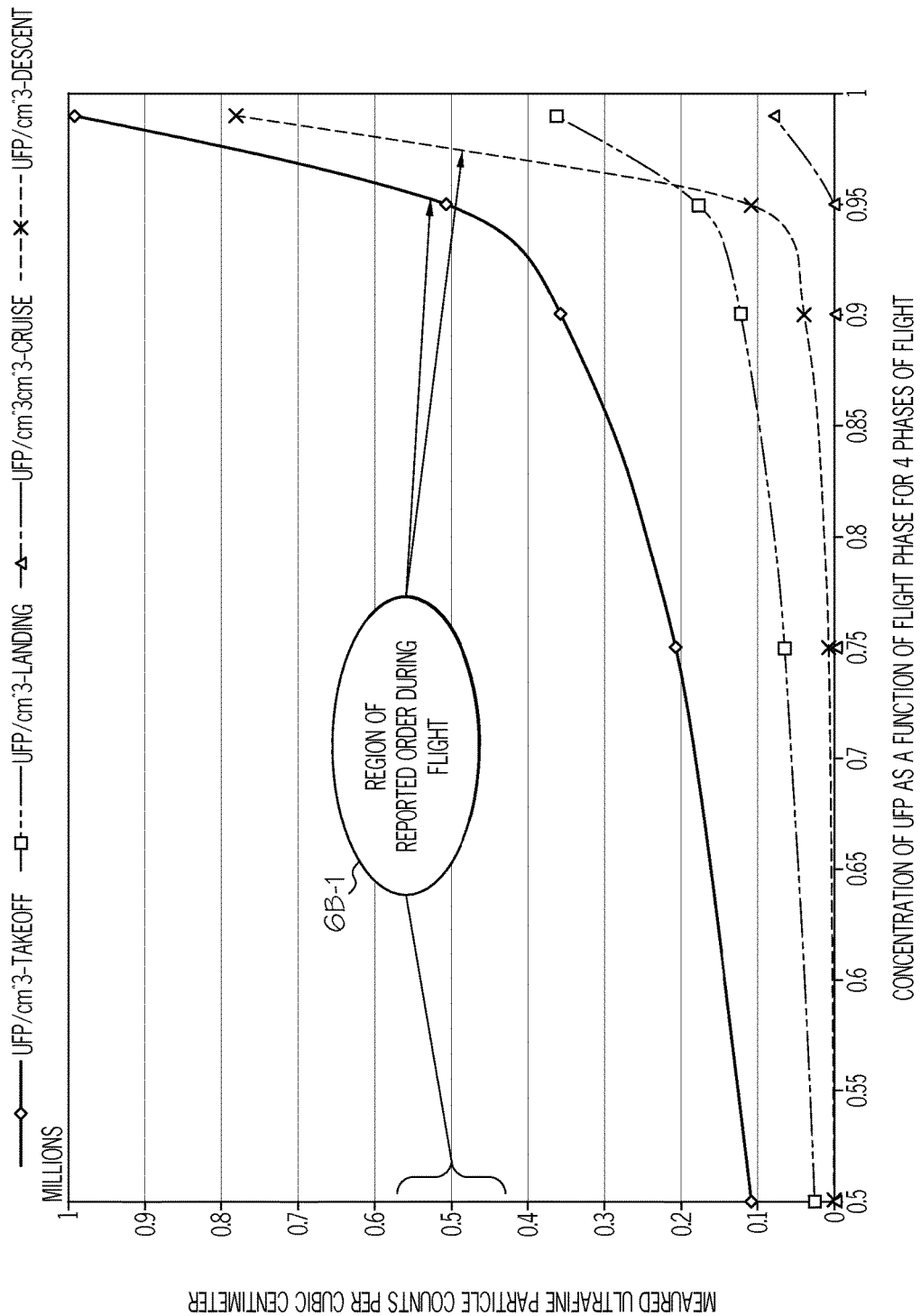
FIG. 6B is a graph of particle concentration versus sample population percentile, over four phases of flight.

In FIG. 6B, a graph is of predicted particulate concentration versus sample population percentile—for four phases of flight. A notation 6B-1 in FIG. 6B indicates that studies have shown occupants reporting odor detection at a particulate concentration between about 400,000 and 600,000 particles per $cm^3$. This range of particulate concentrations intersects, in FIG. 6B, with the plots of take-off and descent. Accordingly, in an embodiment, the present invention may be implemented to control the amount of particulates in air particularly during take-off and/or descent.

Referring back to FIG. 2 and step 23 therein, an exemplary lookup table of predicted contaminant odor detection thresholds is shown in FIGS. 4A-4B. The manner of creating the lookup table is described in US patent application entitled "Human Factors Approach to Control Contaminant Concentrations in Aircraft Supply Air from Engine Bleed and Ground Sources, and in Recirculated Air Being Delivered to Aircraft Cabins for the Optimization of User Experience and Energy Consumption," filed on Jan. 17, 2015, Ser. No. 14/606,617, and incorporated herein by reference in its entirety. The odor detection thresholds can be at one or more population percentiles, which can be the same or different from those in other steps of the method 20.

As described in U.S. Ser. No. 14/606,617, predicted contaminant odor detection thresholds can be converted into dose addition odor ratios (i.e., probabilities of odor detection) on a population percentile basis—and either on an individual contaminant basis and/or multiple contaminant basis—as shown for example in FIGS. 4C-4D. These dose addition odor ratios at different population percentiles and different phases of flight can then be included in a database or table, such as in FIG. 6A, or in a graph, such as in FIG. 6C, described below.

Figure 6C:
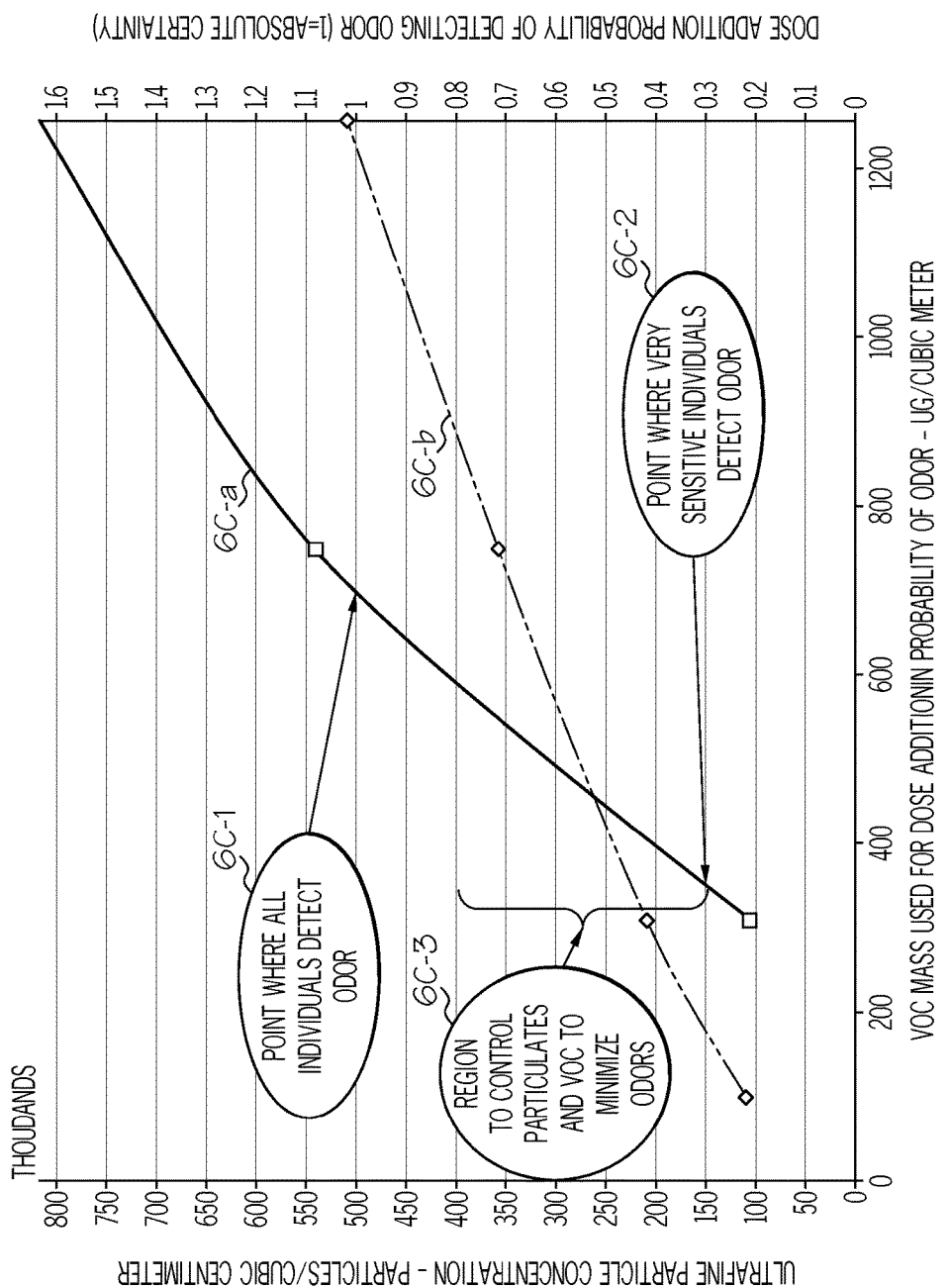
FIG. 6C is a graph of particle concentration versus volatile organic compound concentration versus dose addition probability of odor.

In FIG. 6C, a graph is of predicted particle concentration versus VOC mass for the dose addition odor ratio versus dose addition odor ratio (i.e., probability). One plot (6C-a) is of VOC mass versus dose addition odor ratios (i.e., probabilities of odor detection). The data points of VOC mass, and the data points of dose addition odor ratios, can be obtained from FIG. 6A. Another plot (6C-b) is of predicted particulate concentration versus dose addition odor ratios—for the take-off phase (although other phases of flight can be used, such as descent). The data points of particulate concentration, and the data points of dose addition odor ratios, can be obtained from FIG. 6A.

In FIG. 6C, a notation 6C-1 indicates that at about 500,000 particles/cm$^3$ where there is about a 1.0 probability of odor detection, i.e., all occupants report the detection of odor, the VOC mass is about 700 ug/m$^3$. A notation 6C-2 indicates that at about 150,000 particles/cm$^3$ where there is about a 0.3 probability of odor detection, i.e., only very sensitive occupants report the detection of odor, the VOC mass is about 350 ug/m$^3$. Accordingly, in the region of notation 6C-3, between about 150,000 and 400,000 particles/cm$^3$ where there is about a 0.3 to 0.8 probability of odor detection (i.e., predicted sensory response threshold and/or average sensory response threshold), in an exemplary embodiment, the present invention may be implemented to control the amount of particulates in air, as further described below.

Again referring back to FIG. 2 and step 24 therein, an exemplary lookup table of predicted contaminant sensory irritancy detection thresholds is shown in FIGS. 5A-5B. The manner of creating the lookup table is described in US patent application entitled "Human Factors Approach to Control Contaminant Concentrations in Aircraft Supply Air from Engine Bleed and Ground Sources, and in Recirculated Air Being Delivered to Aircraft Cabins for the Optimization of User Experience and Energy Consumption," filed on Jan. 17, 2015, Ser. No. 14/606,617, and incorporated herein by reference in its entirety. The sensory irritancy detection thresholds can be at one or more population percentiles, which can be the same or different from those in other steps of the method 20.

As described in U.S. Ser. No. 14/606,617, predicted contaminant sensory irritancy detection thresholds can be converted into dose addition sensory irritancy ratios (i.e., probabilities of sensory irritancy) on a population percentile basis—and either on an individual contaminant basis and/or multiple contaminant basis—as shown for example in FIG. 5C. These dose addition sensory irritancy ratios at different population percentiles and at different phases of flight can then be included in a database or table, such as in FIG. 6A, or in a graph, such as in FIG. 6D, described below.

Figure 6D:
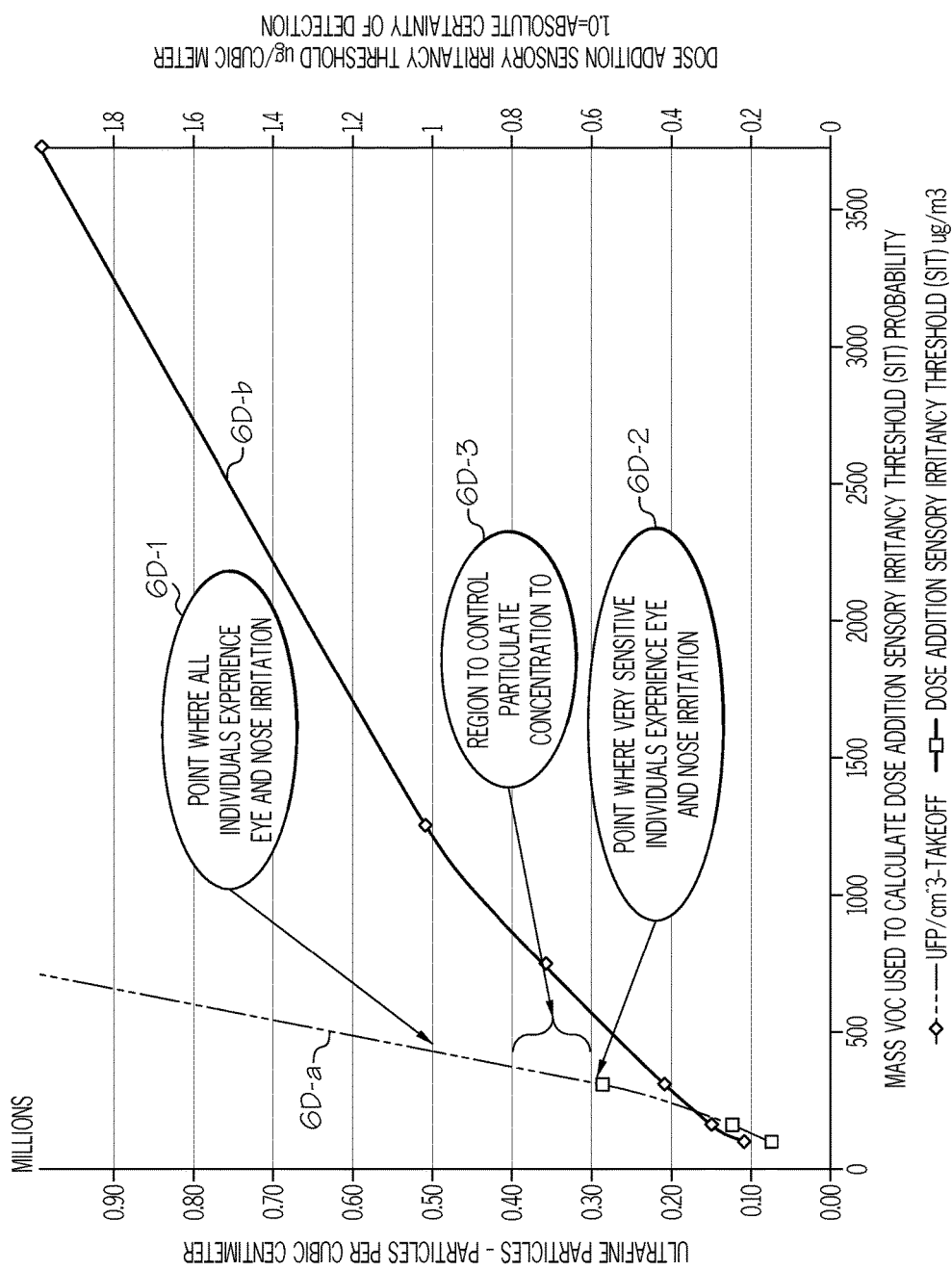
FIG. 6D is a graph of particle concentration versus volatile organic compound concentration versus dose addition probability of irritancy.

In FIG. 6D, a graph is of predicted particulate concentration versus VOC mass for the dose addition irritancy ratio versus dose addition irritancy ratio (i.e., probability). One plot (6D-a) is of VOC mass versus dose addition irritancy ratios (i.e., probabilities of sensory irritancy). The data points of VOC mass, and the data points of dose addition irritancy ratios, can be obtained from FIG. 6A. Another plot (6D-b) is of predicted particulate concentration versus dose addition irritancy ratios—for the take-off phase (although other phases of flight can be used, such as descent). The data points of particle concentration, and the data points of dose addition irritancy ratios, can be obtained from FIG. 6A.

In FIG. 6D, a notation 6D-1 indicates that at about 500,000 particles/cm$^3$ where there is about a 1.0 probability of sensory irritancy, i.e., all occupants report sensory irritancy, the VOC mass is about 400 ug/m$^3$. A notation 6D-2 indicates that at about 300,000 particles/cm$^3$ where there is about a 0.3 probability of odor detection, i.e., only very sensitive occupants report the detection of odor, the VOC mass is about 300 ug/m$^3$. Accordingly, in the region of notation 6C-3, between about 300,000 and 400,000 particles/cm$^3$ where there is about a 0.6 to 0.8 probability of sensory irritancy (i.e., predicted sensory response threshold and/or average sensory response threshold), in an exemplary embodiment, the present invention may be implemented to control the amount of particulates in air, as further described below.

Again referring back to FIG. 2, step 26 can include, according to an exemplary embodiment, sub-steps 26a and 26b.

In an embodiment of sub-step 26a, a comparison can be made between one or more predicted sensory response thresholds (based on one or more probabilities of odor detection) and actual particulate concentration detected by one or more sensors 12.

In an embodiment of sub-step 26b, a comparison can be made between one or more predicted sensory response thresholds (based on one or more probabilities of sensory irritancy detection) and actual particulate concentration detected by one or more sensors 12.

In other embodiments, sub-step 26a and sub-step 26b need not be combined and can be alternative sub-steps.

Again referring back to FIG. 2 and in step 27 therein, adjustments to the outside air and/or recirculating air may be made based on the comparisons made in step 26. In other words, if the detected particle concentration falls in the predicted threshold range of particle concentration(s), adjustments to the outside air and/or recirculating air can be implemented.

In some embodiments, the controller 11 can command adjustments to the air purification subsystem 13. As depicted in FIG. 1B, a valve controlling air flow from an ECS pack to a cabin can be altered 13a. In addition to, or in lieu thereof, a fan speed can be altered 13b.

It should be understood, of course, that the foregoing relates to exemplary embodiments of the invention and that modifications may be made without departing from the spirit and scope of the invention as set forth in the following claims.

We claim:

1. An environmental control system (ECS) having particulates in air therein, comprising:
   a sensor;
   an air purification subsystem; and a controller in communication with the sensor and air purification subsystem;
wherein the sensor:

detects particulates in the air; and generates a particulate concentration signal;

wherein the controller is configured to:

compare the particulate concentration signal to data of predicted particulate concentration at different phases of operation of a vehicle in which the ECS is enabled and predicted particulate concentration threshold versus particulate population percentile;

wherein the predicted particulate concentration threshold is based on one of a probability range of odor detection which is below 100%, a probability range of sensory irritancy detection which is below 100%, and a combination thereof; and when the particulate concentration signal reaches the predicted particulate concentration threshold at a respective phase of vehicle operation, command the air purification subsystem to alter a condition in the air containing the particulates.

2. The ECS of claim 1, wherein the air includes outside air and recirculating air.

3. The ECS of claim 1, wherein the air purification subsystem includes a cooler, a fan, and a filter.

4. The ECS of claim 1, wherein the sensor senses particulates from one of a filter, a manifold, and an ECS pack.

5. The ECS of claim 1, wherein, in a memory of the controller, the predicted particulate concentration threshold is based on a plurality of phases of operation.

6. The ECS of claim 1, wherein, in a memory of the controller, the predicted particulate concentration threshold is based on a plurality of sample population percentiles.

7. The ECS of claim 1, wherein, in a memory of the controller, the predicted particulate concentration threshold is based on one of an odor detection threshold, a sensory irritancy detection threshold, and a combination thereof.

8. The ECS of claim 1, wherein, in a memory of the controller, the predicted particulate concentration threshold is a predicted sensory response threshold.

9. A controller for an environmental control system (ECS) having a sensor and an air purification subsystem, wherein the controller is configured to:

communicate with the sensor and air purification subsystem;

receive a particulate concentration signal from the sensor;

compare the particulate concentration signal to a look up table having a predicted particulate concentration threshold and data of particulate concentration versus particulate population percentile of a sample database;

based on the comparison, command the air purification subsystem to alter a condition of air in the ECS.

10. The controller of claim 9, wherein the particulate concentration signal is based on a plurality of different particulates.

11. The controller of claim 9, wherein the controller commands a valve to alter valve opening/closing.

12. The controller of claim 9, wherein the controller commands a fan to alter a fan speed.

13. The controller of claim 9, wherein the controller commands a modulation of an air purification device.

14. The controller of claim 9, wherein the controller commands different combinations of outside air and recirculated air into the environment.

15. A method for controlling particulates in air in an environment, comprising:

determining a predicted particulate concentration threshold based on one of an odor detection threshold, a sensory irritancy threshold, and a combination thereof;

comparing the predicted particulate concentration threshold to a sensed particulate concentration in the air;

wherein the predicted particulate concentration is based on a best fit between a model concentration plot and an actual concentration plot; and adjusting the air based on the comparison.

16. The method of claim 15, wherein determining a predicted particulate concentration is based on one of an odor detection probability, a sensory irritancy probability, and a combination thereof.

17. The method of claim 15, wherein adjusting the air includes opening and closing a valve to adjust a flow of outside air into the environment.

18. The method of claim 15, wherein adjusting the air includes altering a fan speed of recirculated air into the environment.

19. The method of claim 15, further comprising sensing a plurality of particulate concentrations, in the air, at a plurality of locations in an environmental control system.

* * * * *